United States Patent
Zhang et al.

(10) Patent No.: US 9,783,713 B2
(45) Date of Patent: Oct. 10, 2017

(54) DUAL-CURABLE ADHESIVE COMPOSITION, USE THEREOF, AND PROCESS FOR BONDING SUBSTRATES

(71) Applicant: HENKEL (CHINA) COMPANY LIMITED, Shanghai (CN)

(72) Inventors: Rui Zhang, Shanghai (CN); Daoqiang Lu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 618 days.

(21) Appl. No.: 14/271,519

(22) Filed: May 7, 2014

(65) Prior Publication Data
US 2014/0238580 A1 Aug. 28, 2014

Related U.S. Application Data

(63) Continuation of application No. PCT/CN2012/084287, filed on Nov. 8, 2012.

(30) Foreign Application Priority Data

Nov. 6, 2011 (CN) .......................... 2011 1 0349452

(51) Int. Cl.
| | | |
|---|---|---|
| C08F 2/46 | (2006.01) | |
| C08F 2/50 | (2006.01) | |
| C08G 61/04 | (2006.01) | |
| C09J 163/00 | (2006.01) | |
| B32B 37/12 | (2006.01) | |
| C08F 220/18 | (2006.01) | |
| C08F 220/20 | (2006.01) | |

(52) U.S. Cl.
CPC ......... *C09J 163/00* (2013.01); *B32B 37/1284* (2013.01); *B32B 2037/1253* (2013.01); *C08F 220/18* (2013.01); *C08F 220/20* (2013.01)

(58) Field of Classification Search
CPC ............ C09J 163/00; B32B 2037/1253; B32B 37/1284; C08F 220/20; C08F 220/18; C08L 75/16
USPC ...... 522/16, 12, 7, 6, 189, 184, 1, 71, 8, 13, 522/21, 22; 520/1
See application file for complete search history.

(56) References Cited

U.S. PATENT DOCUMENTS

| | | | |
|---|---|---|---|
| 4,256,828 A | 3/1981 | Smith | |
| 5,453,450 A | 9/1995 | Kinzer et al. | |
| 6,180,200 B1 | 1/2001 | Ha et al. | |
| 6,610,759 B1 * | 8/2003 | Chappelow | A61K 6/0023 |
| | | | 424/49 |
| 7,714,037 B1 * | 5/2010 | Klemarczyk | C08F 2/50 |
| | | | 156/349 |
| 2006/0052628 A1 | 3/2006 | Wiesendanger et al. | |
| 2006/0188711 A1 | 8/2006 | Kishioka et al. | |

FOREIGN PATENT DOCUMENTS

| | | |
|---|---|---|
| CN | 1699492 | 7/2005 |
| CN | 101776844 | 1/2009 |
| CN | 102010686 | 9/2010 |
| JP | 08511569 | 12/1996 |
| JP | 2000501551 | 2/2000 |
| JP | 2002517541 | 6/2002 |
| JP | 2006232882 | 9/2006 |
| JP | 2008-013721 | * 1/2008 |
| JP | 2008013721 | 1/2008 |
| JP | 2009098187 | 5/2009 |

OTHER PUBLICATIONS

Saiki et al, JP 2008-013721 Machine Translation, Jan. 24, 2008.*
Hexion EPONEX Resin 1510 Technical Data Sheet, Dec. 1, 2010.*
Hexion EPON Resin 825 Technical Data Sheet, Dec. 1, 2010.*
International Search Report for PCT/CN2012/084287, 2 pages.

* cited by examiner

*Primary Examiner* — Jessica E Whiteley
(74) *Attorney, Agent, or Firm* — Steven C. Bauman

(57) ABSTRACT

The present invention provides a dual-curable adhesive composition, comprising: component (a): an epoxy resin; at least one selected from component (b) and component (c), wherein component (b) is a (meth)acrylate monomer, and component (c) is an oligomer containing a (meth)acryloxy group; component (d): a thermal polymerization catalyst which catalyzes the thermal polymerization reaction of component (a); and component (e): a photo polymerization initiator which initiates the photo polymerization reaction of component (a) and at least one selected from component (b) and component (c), wherein component (e) is a mixture of a cationic photo polymerization initiator and a radical photo polymerization initiator. The dual-curable adhesive composition of the present invention is used for bonding or laminating a transparent substrate with another transparent substrate, or bonding or laminating a transparent substrate with a non-transparent substrate. The present invention also provides a process for bonding substrates.

17 Claims, 1 Drawing Sheet

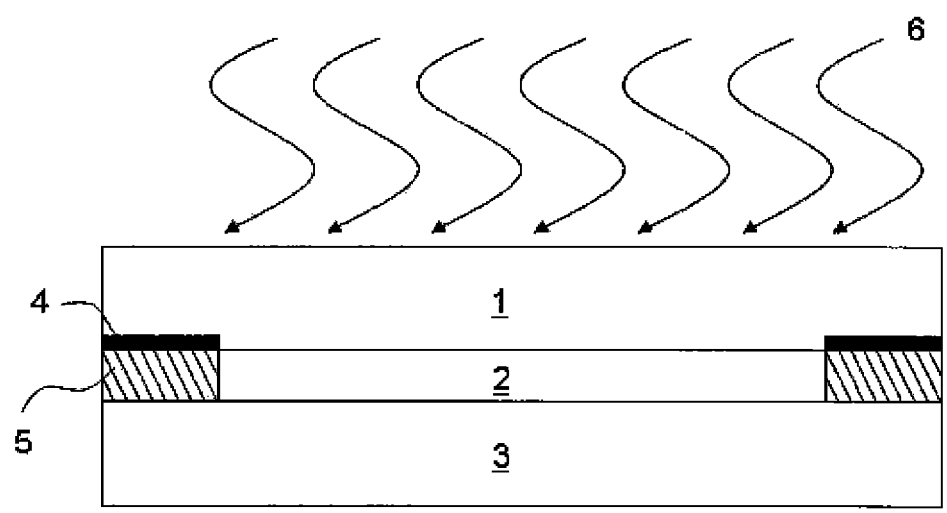

DUAL-CURABLE ADHESIVE COMPOSITION, USE THEREOF, AND PROCESS FOR BONDING SUBSTRATES

The present invention relates to a light-curable and heat-curable adhesive composition, also called "dual-curable adhesive composition". In addition, the present invention also relates to use of the dual-curable adhesive composition and a method for bonding substrates.

Epoxy resins contain active epoxy groups which are prone to ring opening in the presence of a photo polymerization initiator to generate three-dimensional network polymers containing ether bond structures. Since both the ether bonds and the hydroxyl groups derived from the epoxy groups are highly polar, they are capable of forming chemical bonds with free radicals on the surfaces of the adhered substrates so as to exhibit adhesion properties.

Light-curable epoxy resins have advantages such as low curing temperature, rapid curing rate, small shrinkage and environmentally friendly, therefore such epoxy resins are increasingly widely used to laminate or bond electronic elements such as in the fields of small electronic assemblies, fixation of coil ends, bonding and sealing of liquid crystal displays, adhesion of optical fibers and light-emitting tubes, assemblies of optical prisms and glass panels, DVD production and optical waveguide circuits fabrication.

U.S. Pat. No. 4,256,828 discloses a photo-polymerizable composition comprising an organic material having epoxide functional groups, and an organic material having hydroxyl functional groups, and a photo initiator selected from the group consisting of aromatic iodonium salts or aromatic sulfonium salts.

US 2006/0052628 discloses a UV-curable epoxy acrylates having specific structures which is used in painting compositions or dual-curable adhesive compositions and exhibit high UV stability.

However, when the adhesive composition is only cured by light irradiation, there arise problems such as adhesives overflowing, substrates cracking, aging and deformation, and insufficient hardness etc. This issue can be illustrated with reference to FIG. 1 as follows. FIG. 1 is a cross-sectional view showing the light-curing situation of an adhesive in the prior art. The adhesive is applied between a first substrate 1 and a second substrate 3 to be adhered, wherein the first substrate 1 is transparent, followed by irradiation with a suitable light source 6 from above the first substrate 1, the light source 6 passed through the first substrate 1 to initiate the curing of the adhesive 2. However, in practical uses, pattern 4, through which light source 6 cannot pass, is usually set between the first substrate 1 and the adhesive 2 according to requirements, so as to form a black shadow area, rendering the adhesive 5 below the shadow area unable to cure. In addition, problems usually arise due to the improper control of illumination angle, strength and time, for example, the adhesive would cure in the transparent area but fails to cure in the shadow area, or the adhesive only cure at its surface with an incompletely cured inside, which in turn lead to the above-mentioned problems such as adhesives overflowing, substrates cracking, aging and deformation, and insufficient hardness, and result in performance degradation of the final product.

Therefore, it is necessary to develop a dual-curable adhesive composition, which avoids the defects caused by the incomplete curing in the shadow area or inside the adhesive, while maintaining the advantage of light curing so as to improve the performance of the final product on the whole.

In view of the above-mentioned problems, a dual-curable adhesive composition is provided which comprises:

component (a): an epoxy resin;

at least one selected from component (b) and component (c), wherein component (b) is a (meth)acrylate monomer, and component (c) is an oligomer containing a (meth)acryloxy group;

component (d): a thermal polymerization catalyst which catalyzes the thermal polymerization reaction of component (a); and component (e): a photo polymerization initiator which initiates the photo polymerization reaction of component (a) and the at least one selected from component (b) and component (c), wherein component (e) is a mixture of a cationic photo polymerization initiator and a radical photo polymerization initiator.

Preferably, component (a) has on average at least two 1,2-epoxy groups per molecule;

component (a) is preferably selected from the group consisting of polyglycidyl ethers of polyphenols, polyglycidyl ethers of aliphatic polyols, polyglycidyl esters of aliphatic polycarboxylic acids, polyglycidyl esters of aromatic polycarboxylic acids, their derivatives and any combinations of these substances; more preferably diglycidyl ether of biphenol A, diglycidyl ether of hydrogenated biphenol A, polyglycidyl ether of aliphatic polyols or a mixture thereof;

component (a) is preferably liquid at 25° C.;

the epoxy equivalent of component (a) is preferably about 100 to about 220;

component (a) preferably has a Brookfield viscosity in the range of 300 op to 10,000 cp at 25° C., more preferably in the range of 350 cp to 5,000 cp at 25° C.

Preferably, component (b) is a multifunctional (meth)acrylate monomer, or a monofunctional (meth)acrylate monomer selected from the group consisting of alkyl (meth)acrylate, alkenyl (meth)acrylate and heterocyclic (meth)acrylate, or any combinations of these monomers, wherein the alkyl group has 1 to 20 carbon atoms and it can be further substituted, the alkenyl group has 2 to 20 carbon atoms and it can be further substituted, and the heterocyclic group has 2 to 20 carbon atoms and at least one heteroatom selected from nitrogen and oxygen, and it can be further substituted, wherein the substituent being at least one independently selected from the group consisting of an alkyl group having 1 to 10 carbon atoms, an alkoxy group having 1 to 10 carbon atoms, an aryloxy group having 6 to 10 carbon atoms, an epoxy group, and a hydroxy group; and component (b) is preferably liquid at 25° C.

Preferably, component (c) is polybutadiene containing a (meth)acryloxy group, polyisoprene containing a (meth)acryloxy group, polyurethane containing a (meth)acryloxy group and polyester containing a (meth)acryloxy group, or any combinations thereof; preferably polyurethane containing a (meth)acryloxy group; more preferably aliphatic polyurethane containing a (meth)acryloxy group;

component (c) preferably has at least one epoxy group per molecule;

component (c) is preferably liquid at 25□;

component (c) preferably has Tg in a range about −100° C. to 20° C.;

component (c) preferably has an average (meth)acryloxy functionality of greater than 0 but less than or equal to 3, more preferably greater than 0.5 but less than or equal to 3.

Preferably, component (d) is a hexafluoroantimonate-based metal salt; more preferably a hexafluoroantimonate-based ammonium salt.

Preferably, the cationic photo polymerization initiator in component (e) is selected from the group consisting of aromatic diazonium salts, aromatic sulfonium salts, aromatic iodonium salts, alkyl sulfonium salts, (6-cumene)(5-cyclopentadienyl)iron hexafluorophosphate, titanocenes, sulfonyloxy ketones and triaryl-siloxyethers, and any combinations thereof, wherein the alkyl group has 1 to 30 carbon atoms, and the aryl group has 7 to 30 carbon atoms; more preferably titanocene, still more preferably bis[2,6-difluoro-3-(1H-pyrrol-1-yl)phenyl]titanium and bis(pentafluorophenyl) titanocene; and the radical photo polymerization initiator is selected from the group consisting of benzoin ketals, hydroxyketones, amino ketones, acylphosphine peroxides, and any combinations thereof.

Preferably, the composition additionally comprises component (f): polyether polyols; preferably polyether polyols having at least two hydroxy groups per molecule.

Preferably, the composition comprises both component (b) and component (c);

the composition optionally comprises one or more other additives selected from the group consisting of thermally curing agents, light sensitizers, radical scavengers, photo stabilizers, wetting agents, leveling agents, colorants and plasticizers;

the thermally curing agent is preferable an amine-based curing agent, and the content of the thermally curing agent is preferably 0 to 60 parts by weight.

Preferably, based on 100 parts by weight of the composition, the content of each component is:
  20-80 parts by weight of component (a);
  10-75 parts by weight of component (b);
  0.5-5 parts by weight of component (d);
  1-5 parts by weight of component (e); and
  0-10 parts by weight of component (f).

Preferably, based on 100 parts by weight of the composition, the content of each component is:
  20-80 parts by weight of component (a);
  15-80 parts by weight of component (c);
  0.5-5 parts by weight of component (d);
  1-5 parts by weight of component (e); and
  0-10 parts by weight of component (f).

Preferably, based on 100 parts by weight of the composition, the content of each component is:
  20-60 parts by weight of component (a);
  15-60 parts by weight of component (b);
  15-60 parts by weight of component (c);
  0.5-5 parts by weight of component (d);
  1-5 parts by weight of component (e); and
  0-10 parts by weight of component (f);
  the total content of component (b) and component (c) is preferably 20-75 parts by weight.

Preferably, the composition is liquid at 25° C., the light transmittance of the composition after curing is more than 95%, and the haze of the composition after curing is less than 1%;

the composition preferably has a Brookfield viscosity of 50 cp to 40,000 cp at 25° C.

In addition, the present inventions also provides a use of the composition for bonding or laminating a transparent substrate with another transparent substrate, or bonding or laminating a transparent substrate with a non-transparent substrate; and preferably, the transparent substrate comprises glass and transparent plastic, and the non-transparent substrate comprises metal, non-transparent plastic, ceramic, stone, leather and wood; and the composition is more preferably used for bonding or laminating glass substrates.

Furthermore, the present invention also provides a process for bonding substrates, comprising the following steps:
  applying the composition as defined above between the substrates to be bonded;
  exposing the substrates which have been applied with the composition to photo irradiation; and
  heating the substrates which have been applied with the composition;
  the photo irradiation step is preferably carried out before the heating step;
  preferably, the composition is applied between a transparent substrate and another transparent substrate, or between a transparent substrate and a non-transparent substrate;
  more preferably, the transparent substrate comprises glass and transparent plastic, and the non-transparent substrate comprises metal, non-transparent plastic, ceramic, stone, leather and wood.

Still more preferably, after the photo irradiation step, the substrates are locally heated at portions which have not been completely cured.

The inventors surprisingly found that upon photo irradiation and heating, the composition comprising an epoxy resin, at least one selected from an (meth)acrylate monomer and an oligomer containing a (meth)acryloxy group, and a thermal polymerization catalyst and a photo polymerization initiator can achieve a thorough cure and maintain the advantages such as rapid curing rate and being environmentally friendly, the defects which might be caused by incomplete curing, such as adhesives overflowing, substrates cracking, aging and deformation, and insufficient hardness were avoided. Therefore, a final product which has good optical characteristics and mechanical characteristics can be obtained.

In particular, the composition of the present invention contains an epoxy resin and at least one selected from an (meth)acrylate monomer and an oligomer containing a (meth)acryloxy group at the same time, and these substances may crosslink when subject to light irradiation so as to promote the photo curing rate of the whole dual-curable adhesive composition and impart rapid curing property to the dual-curable adhesive composition.

Many other features, aspects and advantages of the present invention will become apparent from the following description, Examples and accompanying claims.

FIG. 1 is a cross-sectional view showing the light-curing situation of an adhesive in the prior art.

In the context of the present application, all the scientific and technical terms, unless otherwise indicated, shall have the same meanings as those known to a person skilled in the art. Where there is inconsistency, the definition provided in the present application should be taken.

Unless otherwise specified, all the percentages in this context are weight percents based on the total weight of the dual-curable adhesive composition. A content of 0% indicates that the dual-curable adhesive composition of the present invention may not contain the corresponding component.

Generally, a structural formula, chemical composition and component content of a composition in the epoxy resin field, especially in a dual-curable adhesive composition obtained in industrial scale, intend to mean a main structure or main ingredient, allowing the presence of permissible deviations.

Unless otherwise specified, the numerical range in this context intends to include both the two end points and all the numbers therebetween.

All the materials, contents, methods and examples are presented for the purposes of illustration, and therefore, unless expressly specified otherwise, are not construed as limitations of the present invention.

The terms "dual-curable adhesive composition", "adhesive" and "composition" have the same meaning and can be used to replace each other.

Each component of the dual-curable adhesive composition of the present invention will be illustrated as below.

Unless otherwise specified, the term "viscosity" in this context means Brookfield viscosity at 25° C.

[Component (a): An Epoxy Resin]

Generally speaking, polymers having on average at least one 1,2-epoxy group per molecule are suitable to be used as the "epoxy resin" of the present invention. The epoxy resin can be saturated or unsaturated, cyclic or acyclic, aliphatic, aromatic or heterocyclic.

Preferably, the epoxy resin used in the present invention has on average at least two 1,2-epoxy groups per molecule.

There is no specific limitation to the epoxy resins used in the present invention, which may be selected from the group consisting of polyglycidyl ethers of polyphenols, polyglycidyl ethers of aliphatic polyols, polyglycidyl esters of aliphatic polycarboxylic acids, polyglycidyl esters of aromatic polycarboxylic acids, their derivatives and any combinations of these substances.

The polyglycidyl ethers of polyphenols can be prepared by the reaction of epichlorohydrin or epibromohydrin with polyphenol in the presence of an alkali. Examples of the polyphenol suitable to be employed herein are resorcin, pyrocatechol, hydroquinone, biphenol A (also called bis(4-hydroxyphenyl)2,2-propane), biphenol F (also called bis(4-hydroxyphenyl)methane, bis(4-hydroxyphenyl)-1,1-isobutane, 4,4'-dihydroxy-benzophenone, bis(4-hydroxyphenyl)-1,1-ethane, and 1,5-hydroxy naphthalene. Other polyphenols suitable as basis of the polyglycidyl ethers of polyphenols may be as condensates of phenols of phenolic varnish type with formaldehyde or acetaldehyde. In addition, polyglycidyl ethers of hydrogenated biphenol A (also called 2,2-bis(4-hydroxycyclohexyl)propane) can be also be used.

The polyglycidyl ethers of aliphatic polyols derives from polyols such as ethylene glycol, diethylene glycol, triethylene glycol, 1,2-propylene glycol, 1,4-butylene glycol, 1,5-pentanediol, 1,6-hexanediol, cyclohexanedimethanol or trimethylolpropane etc.

Examples of the polyglycidyl esters of polycarboxylic acids may be reaction products of glycide or epichlorohydrin with aliphatic or aromatic polycarboxylic acids such as oxalic acid, succinic acid, glutaric acid, o-phthalic acid, terephthalic acid or fatty acid dimer.

Suitable epoxy resins may also be derived from ethylenic unsaturated alicyclic compounds or natural oils and fats (for example, epoxidized castor oil).

In addition, epoxidized polyolefins (such as epoxidized polybutadiene and epoxidized polyisoprene etc) and epoxidized polyesters having at least one epoxy group per molecule may also be used as the epoxy resin in the dual-curable adhesive composition of the present invention.

Diglycidyl ethers of biphenol A, diglycidyl ethers of hydrogenated biphenol A, polyglycidyl ethers of aliphatic polyols and mixtures thereof are especially preferably.

Preferably, the epoxy resin used in the dual-curable adhesive composition of the present invention is liquid at 25° C.

The epoxy equivalent of said epoxy resin is usually about 100 to about 220. The epoxy equivalent is defined as grams of the epoxy resin containing one equivalent of epoxy groups.

Preferably, the epoxy resin used in the present invention has a Brookfield viscosity in the range of about 300 cp to about 10,000 cp at 25° C., more preferably in the range of about 350 cp to about 5,000 cp at 25° C.

In the present invention, the epoxy resin may be used alone or in any combinations of two or more. The content of component (a) may be 20-95 parts by weight, preferably 20-80 parts by weight, more preferably 20-60 parts by weight, still more preferably 35-60 parts by weight, based on 100 parts by weight of the dual-curable adhesive composition of the present invention. If the contents of the epoxy resins fall within these ranges, it would facilitate the dual curing of the adhesive composition of the present invention.

[Component (b): A (Meth)Acrylate Monomer]

The dual-curable adhesive composition of the present invention may comprise (meth)acrylate monomer. Since the (meth)acrylate monomer may crosslink upon photo irradiation due to the presence of the (meth)acryloxy unsaturated group in its molecule, which in turn promotes the photo curing rate of the whole dual-curable adhesive composition and imparts rapid curing property to the dual-curable adhesive composition. In addition, said monomer can be used to adjust the Brookfield viscosity and bonding property of the dual-curable adhesive composition and improve the storage stability of the composition due to its low viscosity at 25V.

The term "(meth)acryloxy" group (i.e. $CH_2=CRC(O)O-$, R being H or $CH_3$) represents acryloxy, (meth)acryloxy group or their combination; and the term "(meth)acrylate" represents acrylate, methacrylate or their combination.

There is no specific limitation to the (meth)acrylate monomer used in the present invention, which may be a monofunctional (meth)acrylate monomer or a multifunctional (meth)acrylate monomer and any combinations thereof.

As illustrated examples of the monofunctional (meth)acrylate monomer, alkyl (meth)acrylates, alkenyl (meth)acrylates and heterocyclic (meth)acrylates can be mentioned.

Preferably, the alkyl group may have 1 to 20 carbon atoms, preferably 1 to 10 carbon atoms, and the alkyl group is optionally substituted. The substituent may be at least one selected from the group consisting of an alkyl group having 1 to 10 carbon atoms, an alkoxy group having 1 to 10 carbon atoms, an aryloxy group having 6 to 10 carbon atoms, an epoxy group, and a hydroxy group etc.

Preferably, the alkenyl group may have 2 to 20 carbon atoms, preferably 2 to 10 carbon atoms, and the alkenyl group is optionally substituted. The substituent may be at least one selected from the group consisting of an alkyl group having 1 to 10 carbon atoms, an alkoxy group having 1 to 10 carbon atoms, an aryloxy group having 6 to 10 carbon atoms, an epoxy group, and a hydroxy group etc.

Preferably, the heterocyclic group may have 2 to 20, preferable, 2 to 10 carbon atoms and at least one heteroatom selected from nitrogen and oxygen, and the heterocyclic group is optionally substituted. The substituent may be at least one selected from the group consisting of an alkyl group having 1 to 10 carbon atoms, an alkoxy group having 1 to 10 carbon atoms, an aryloxy group having 6 to 10 carbon atoms, an epoxy group, and a hydroxy group etc.

Specific examples of monofunctional (meth)acrylate monomer may include but are not limited to methyl (meth)acrylate, ethyl (meth)acrylate, butyl (meth)acrylate, tetrahydrofuran (meth)acrylate, lauryl acrylate, isooctyl acrylate, isodecyl acrylate, 2-ethylhexyl acrylate, isobornyl (meth) acrylate, dicyclopentenyl (meth)acrylate, isostearyl acrylate, hydroxyethyl methacrylate, hydroxypropyl (meth)acrylate, hydroxybutyl (meth)acrylate, 2-(2-ethoxyethoxy)ethyl acrylate, 2-phenoxy ethyl acrylate, dicyclopentadienyl (meth) acrylate, dicyclopentenyloxyethyl (meth)acrylate, morpholine (meth)acrylate, and caprolactone acrylate etc.

Non-limiting examples of multifunctional (meth)acrylate monomer include ethylene glycol dimethacrylate, hexylene glycol di(meth)acrylate, trimethylolpropane triacrylate and pentaerythritol tetraacrylate etc.

Preferably, these (meth)acrylate monomers are liquid at 25° C.

In the dual-curable adhesive composition of the present invention, the (meth)acrylate monomer may be used alone or in any combinations of two or more. The content of component (b) may be 0-75 parts by weight, preferably 10-75 parts by weight, more preferably 15-60 parts by weight, still more preferably 15-30 parts by weight, based on 100 parts by weight of the adhesive composition of the present invention.

[Component (c): An Oligomer Containing a (Meth)Acryloxy Group]

The dual-curable adhesive composition of the present invention may comprise an oligomer containing a (meth) acryloxy group. Same with the above illustration for (meth) acrylate monomers, the oligomer containing a (meth)acryloxy group may crosslink upon photo irradiation due to the presence of the (meth)acryloxy unsaturated group in its molecule, which in turn promotes the photo curing rate of the whole dual-curable adhesive composition and imparts rapid curing property to the dual-curable adhesive composition. In addition, the presence of the oligomer having curing activity can also adjust the Brookfield viscosity and bonding property, and improve the storage stability of the dual-curable adhesive composition.

The (meth)acryloxy group may be at any position in the oligomer molecule, preferably at the end of the backbone and/or in the side chains.

Preferably, oligomer containing a (meth)acryloxy group is polybutadiene containing a (meth)acryloxy group; polyisoprene containing a (meth)acryloxy group, such as UC-203 and UC-102 etc available from Kuraray Corporation; polyurethane containing a (meth)acryloxy group, such as CN962, CN964, CN965, CN934, CN972, CN8004 and CN9002 available from Sartomer Corporation, BR3641AA available from Bomar Corporation; polyester containing a (meth)acryloxy group, such as CN292, CN2200, CN9021 and CN2255 available from Sartomer Corporation; or any combinations thereof. All these listed oligomers are commercially available.

Other examples of the oligomer containing a (meth) acryloxy group used in the present invention include but not limited to styrene-butadiene copolymer containing a (meth) acryloxy group, acrylonitrile-butadiene copolymer containing a (meth)acryloxy group, polyisobutylene containing a (meth)acryloxy group, ethylene-propylene rubber containing a (meth)acryloxy group (ethylene-propylene copolymer), butyl rubber containing a (meth)acryloxy group (isobutylene-isoprene copolymer), brominated butyl rubber containing a (meth)acryloxy group (brominated isobutylene-isoprene copolymer), chlorinated butyl rubber containing a (meth)acryloxy group (chlorinated isobutylene-isoprene copolymer), and any combinations thereof. The species corresponding to the above-listed oligomers which don't contain a (meth)acryloxy group are commercially available, and since they have reactive groups such as hydroxy group in their molecules, they can react with (meth)acrylates to obtain the corresponding oligomers containing a (meth) acryloxy group.

Polyurethane containing a (meth)acryloxy group is preferable. Aliphatic polyurethane containing a (meth)acryloxy group is more preferable, which has a Brookfield viscosity of several thousand cp to more than one hundred thousand cp, for example about 1,000 cp to about 190,000 cp. The term "aliphatic" herein is relative to the term "aromatic", provided that there is no aromatic ring in the molecule of the polyurethane since aromatic ring leads to degradation of the color characteristics and light transmittance. Typically, the aliphatic polyurethane may be polyurethanes of polyester type, polyurethanes of polyether type and polyurethanes of polybutadiene type etc.

Preferably, the oligomer containing a (meth)acryloxy group has at least one epoxy group in its molecule. Since there are both epoxy group and (meth)acryloxy group which are active to chemical crosslink in the molecule of the oligomer, it can advantageously enhance the curing property of the dual-curable adhesive composition of the present invention, promotes the photo curing rate of the whole adhesive composition and imparts rapid curing property to the adhesive composition.

The oligomer can be prepared by the esterification of corresponding epoxy resin (for example, the above-mentioned diglycidyl ethers of biphenol A) and (meth)acrylic acid.

Preferably, the oligomer containing a (meth)acryloxy group of the present invention is liquid at 25° C.

Preferably, the oligomer containing a (meth)acryloxy group of the present invention has a Tg of from about −100° C. to 20° C.

Preferably, the oligomer containing a (meth)acryloxy group has an average functionality of acryloxy greater than 0 but less than or equal to 3, preferably greater than 0.5 but less than or equal to 3. The term "an average functionality" means an average number of the (meth)acryloxy group per molecule.

In the dual-curable adhesive composition of the present invention, oligomer containing a (meth)acryloxy group may be used alone or in any combinations of two or more. The content of component (c) may be 0 to 80 parts by weight, more preferably 15 to 80 parts by weight, still more preferably 15 to 60 parts by weight, and most preferably 30 to 50 parts by weight, based on 100 parts by weight of the dual-curable adhesive composition of the present invention.

The dual-curable adhesive composition of the present invention comprises at least one selected from the group consisting of (meth)acrylate monomers and oligomers containing a (meth)acryloxy group. Preferably, the dual-curable adhesive composition of the present invention contains a (meth)acrylate monomer and an oligomer containing a (meth)acryloxy group at the same time, and their total content may be 10-80 parts by weight, preferably 20-75 parts by weight, more preferably 25-65 parts by weight, based on 100 parts by weight of the dual-curable adhesive composition of the present invention. Here, the (meth) acrylate monomer and the oligomer containing a (meth) acryloxy group may be mixed at any ratios.

[Component (d): A Thermal Polymerization Catalyst]

The thermal polymerization catalyst is used to catalyze the thermal polymerization reaction of the epoxy resin, helps to reduce the thermal curing temperature and shorten the thermal curing time. Hexafluoroantimonate-based metal salts, such as hexafluoroantimonate-based ammonium salt (available from King industry Inc. under the tradename of K1612) may be used herein.

The content of component (d) may be 0.5-5 parts by weight, preferably 0.5-2.5 parts by weight, more preferably 1.5-2.0 parts by weight, based on 100 parts by weight of the dual-curable adhesive composition of the present invention.

[Component (e): A Photo Polymerization Initiator]

The photo polymerization initiator is used to initiate the photo polymerization reaction of the epoxy resin, the (meth) acrylate monomer (if any) and the oligomer containing a (meth)acryloxy group (if any) and fasten the rate of cross-link curing. The photo polymerization initiator of the present invention is a mixture of a cationic photo polymerization initiator and a radical photo polymerization initiator.

[A Cationic Photo Polymerization Initiator]

The dual-curable adhesive composition of the present invention may contain a cationic photo polymerization initiator which is mainly used to initiate the photo polymerization reaction of the epoxy resin. There is no specific limitation to the cationic photo polymerization initiator used in the present invention, which may be selected from the group consisting of aromatic diazonium salts, aromatic sulfonium salts, aromatic iodonium salts, alkyl sulfonium salts, (6-cumene)(5-cyclopentadienyl)iron hexafluorophosphate, titanocenes, sulfonyloxy ketones and triaryl-siloxyethers, and any combinations thereof, wherein the alkyl group has 1 to 30 carbon atoms, and the aryl group has 7 to 30 carbon atoms.

Specific examples of aromatic sulfonium salt and aromatic iodonium salt may include diaryl iodonium salt, triaryl sulfonium salt, dialkyl benzyl methyl sulfonium salt, triaryl sulfonium oxide salt, aryloxy diaryl sulfonium oxide salt and dialkyl benzyl methyl sulfonium oxide salt etc.

Ferrocenium salt is preferably (6-cumene)(5-cyclopentadienyl)iron hexafluorophosphate. Specific examples of the ferrocenium salt include Irgacure 261 (chemical name: (6-cumene)(5-cyclopentadienyl) iron(II) hexafluorophosphate, available from Ciba Specialty Chemicals Inc.), naphthalene ferrocene hexafluorophosphate and pyrene ferrocene hexafluorophosphate etc.

The photo initiators of titanocenes type are preferably used as the cationic photo polymerization initiator of the present invention. Specific examples thereof include Irgacure 784 (chemical name: bis[2,6-difluoro-3-(1H-pyrrol-1-yl)phenyl]titanium, available from Ciba Specialty Chemicals Inc.) and his (pentafluorophenyl)titanocene etc.

[A Radical Photo Polymerization Initiator]

The dual-curable adhesive composition of the present invention may contain a radical photo polymerization initiator which is mainly used to initiate the photo polymerization reactions of the (meth)acrylate monomer (if any) and the oligomer containing a (meth)acryloxy group (if any) in the adhesive composition.

There is no specific limitation to the radical photo polymerization initiator used in the present invention, which may be selected from the group consisting of benzoin ketals, hydroxyketones, amino ketones, acylphosphine peroxides, and any combinations thereof.

Specific examples of the photo polymerization initiators of benzoin ketal type may be commercially available Irgacure 651; specific examples of the photo polymerization initiators of hydroxyketone type may be, for example, commercially available Darocure 1173(HMPP), Darocure 2959(HHMP) and Darocure 184(HCPK) etc; specific examples of the photo polymerization initiators of amino ketone type may be, for example, commercially available Irgacure 907(MMMP) and Irgacure 369(BDMB) etc; specific examples of the photo polymerization initiators of acylphosphine peroxide type may be, for example, commercially available TEPO, TPO and Irgacure 819 (BAPO, available from Ciba Specialty Chemicals Inc.) etc.

In the dual-curable adhesive composition of the present invention, the photo polymerization initiator is a mixture of the cationic photo polymerization initiator and the radical photo polymerization initiator. These photo polymerization initiators may be used alone or in any combinations of two or more. The total content of component (e) may be 1-5 parts by weight, preferably 1.5-5 parts by weight, more preferably 2-5 parts by weight, based on 100 parts by weight of the dual-curable adhesive composition of the present invention.

[Component (f): A Polyether Polyols]

The dual-curable adhesive composition of the present invention may optionally contain a polyether polyols so as to adjust the flexibility of the composition and improve the cracking resistance and the impact resistance of the final product after curing.

The term "polyether polyols" in this context means a polymer having an ether bond in its main chain and a hydroxyl group (—OH) in its side chain or at the end of the main chain. The polyether polyols preferably have at least two hydroxy groups per molecule. Generally, the polyether polyols are polyether oligomers formed by the condensation of a polyol such as a dial. Specific examples of the polyether polyols may derive from ethylene glycol, propylene glycol, glycerin, butanediol and trimethylol propane etc.

Preferably, the polyether polyols of the present invention has a molecular weight of about 200 to about 5000, preferably about 400 to about 4000.

In the dual-curable adhesive composition of the present invention, the polyether polyols may be used alone or in any combinations of two or more. The content of polyether polyols may be 0-10 parts by weight, preferably 2-10 parts by weight, based on 100 parts by weight of the dual-curable adhesive composition of the present invention.

[Other Additives]

The dual-curable adhesive composition of the present invention may also comprise various additives other than the above-mentioned components (a) to (f), when necessary. These additives and their contents are commonly known in the adhesive field. Examples of the additives include thermally curing agents, peroxides, light sensitizers, radical scavengers, photo stabilizers, wetting agents, leveling agents, colorants and plasticizers, and other adhesive promoter which can improve the property, such as viscosity, adhesion strength or flexibility of the composition.

An amine curing agent and an anhydride curing agent are preferably used as the thermally curing agent, and the content of the thermally curing agent may be 0-65 parts by weight, preferably 0-60 parts by weight, more preferably 5-25 parts by weight based on 100 parts by weight of the dual-curable adhesive composition.

The amine curing agents commonly used for epoxy resins may be employed in the present invention, for example, polyamine curing agents, tertiary amine curing agents, imidazole curing agents, boron amines and boron-amine complexes. Specific examples of the polyamine curing agent include ethylene diamine, diethylenetriamine, isophorone diamine and m-phenylenediamine etc. Examples of tertiary amine curing agent include triethanol amine, tetramethyl-guanidine and N,N'-dimethyl-piperazine etc. Examples of imidazole curing agent include 1-methyl imidazole, 2-ethyl- 4-methyl imidazole and 2-phenyl imidazole etc. Typical examples of boron amine curing agent is boron trifluoride-monoethylamine complex.

The anhydride curing agent is preferably liquid at 25° C. Examples of these anhydride curing agents include methyl phthalic anhydride, methylhexahydrophthalic anhydride, dodecenylsuccinic anhydride and methyl endomethylene tetrahydrophthalic anhydride etc. Anhydride which is solid at 25° C. may also be employed in the present invention. The solid anhydride may be dissolved in an anhydride which is liquid at 25° C., and may be used in the form of a mixture of a solid anhydride and a liquid anhydride.

[The Dual-Curable Adhesive Composition]

The dual-curable adhesive composition of the present invention is liquid, and the Brookfield viscosity of the composition is preferably about 50 cp to about 40,000 cp at 25° C. The liquid adhesive composition in such range of viscosity has a good flowing property which makes it easy to be applied or injected onto a substrate. The Brookfield viscosity here is measured by using a Brookfield rotational viscometer (digital Brookfield viscometer, DV-II+, available from BROOKFIELD, US) at 25° C. according to ASTM D1084-1997.

The dual-curable adhesive composition of the present invention has a clear appearance, and maintains the clear appearance and excellent optical properties, for example, a light transmittance of greater than 95%, and a haze of less than 1% after curing by photo-irradiating and heating.

The light transmittance in the visible light wavelength of the adhesive composition after curing is measured by using an ultraviolet-visible spectrophotometer (Cary-300, available from Varian, America) according to ASTM D1003-2007. The same method can be used to measure the haze.

The composition of the present invention contains the epoxy resin and the at least one selected from an (meth) acrylate monomer and an oligomer containing a (meth) acryloxy group at the same time, and these substances may crosslink upon photo irradiation so as to promote the photo curing rate of the whole dual-curable adhesive composition and impart rapid curing property to the dual-curable adhesive composition.

In addition, the dual-curable adhesive composition of the present invention contains a photo polymerization initiator, which makes the composition crosslink and cure fast upon light irradiation, and therefore the light curing is quickly completed in about 30 seconds.

Especially, the dual-curable adhesive composition of the present invention contains a thermal polymerization catalyst, which helps to reduce the thermal curing temperature and shorten the thermal curing time. Therefore, a final product which had good optical characteristics and mechanical characteristics was obtained, which avoid the defects caused by incomplete curing, such as adhesives overflowing, substrates cracking, aging and deformation, and insufficient hardness, while maintain the advantages such as rapid curing rate and environmentally friendly.

[Preparation of the Dual-Curable Adhesive Composition]

Any appropriate method and any appropriate sequence may be applied to mix the epoxy resin, (meth)acrylate monomer and/or oligomer containing a (meth)acryloxy group, the thermal polymerization catalyst, the photo polymerization initiator and any other optional components. Mixing can be carried out continuously or intermittently, with or without stirring. The stirring rate in different stages of the mixing may be the same or different, for example the stirring rate in a previous stage may be set at from about 50 to 80 rpm, and the stirring rate in a latter stage may be set at from about 80 to 120 rpm.

Upon the addition of the photo polymerization initiator and afterwards subsequent mixing and storage should be carried out under weak luminescence condition, preferably avoiding light. It is advantageous to finish the mixing of other components prior to mixing the photo polymerization initiator with the components which are photo polymerization active. The temperature and time period for mixing may be appropriately set according to actual needs.

[Use of the Dual-Curable Adhesive Composition]

The dual-curable adhesive composition of the present invention may be used for bonding or laminating various elements in a display, especially for bonding or laminating a transparent substrate with another transparent substrate, or bonding or laminating a transparent substrate with a non-transparent substrate. The transparent substrate comprises glass and transparent plastic etc, and the non-transparent substrate comprises metal, non-transparent plastic, ceramic, stone, leather and wood etc. Plastic may be for example poly(methyl methacrylate) (PMMA), polycarbonate (PC) or polyester (PET) etc.

[Process for Bonding Substrates]

The process for bonding substrates with the dual-curable adhesive composition of the present invention is as follows: applying the composition between the substrates to be bonded, followed by photo irradiation and heating so as to make the composition cure.

[Applying/Injection]

The dual-curable adhesive composition of the present invention may be applied between substrates by conventional applying or injecting methods. Conventional applying methods can be for example slit coating, spray coating, spin coating, roll coating and cast coating etc. The application thickness of the composition may be selected according to actual needs. The application thickness is preferably as small as possible, for example from about 50 μm to about 200 μm, preferably from about 100 μm to about 150 μm.

As shown in FIG. 1, if necessary, a shadow area is set on the first substrate which is transparent. The shadow area may be obtained by attaching a non-transparent material, or by conventional lithography development or printing. The position and the pattern of the shadow area may be set according to actual need. For example, the shadow area may be located around the transparent first substrate, or any other place of the transparent first substrate. The pattern of the shadow area may be regular or irregular. The width of the shadow area may be set according to actual need, for example, it can be about 1 mm, about 2 mm or about 3 mm etc.

[Curing]

The substrates with the above-mentioned dual-curable adhesive composition applied thereon is subjected to photo-irradiation and heating. The photo irradiation step is preferably carried out prior to the heating step.

Light source (such as ultraviolet light and visible light) and high energy ray (such as electronic beam, α-ray, γ-ray and X-ray) can be used herein for photo irradiation, with preference given to ultraviolet light in the wavelength range of about 200 nm to about 400 nm. The energy dose is 3000 mJ/cm$^2$ or more, the power density is about 100 mW/cm$^2$, and the irradiation time is 30 seconds or more.

There is no specific limitation to the heating method, as long as it can be carried out in a light-avoiding condition. The sample may be heated as a whole by using a conventional curing apparatus such as a drying oven, a sealed curing oven or a tunnel oven which makes continuous curing possible, it may also be heated at specified positions by using an accurate apparatus. For example, areas of the element which are not completely cured are locally heated after photo irradiation by using iCure AS200 available from IRphotonics.

There is no specific limitation to the heating source, and conventional methods may be used such as hot air circulation, infrared heating and high frequency heating. The curing temperature may be 80□ or higher, preferably about 80 to about 100□. The curing time may be 0.5 to 2 hours.

EXAMPLES

The present invention is described below in more detail by means of examples, wherein the specific materials, contents, data and other conditions and details in the examples serve solely to illustrate the modes to carry out the invention and advantageous effects thereof and do not represent any limitations of the inventive concept.

Materials

Synasia S21: epoxy resin, available form Synasia Inc., the epoxy equivalent being about 131 to about 143, and the Brookfield viscosity at 25□ being about 350 to about 450;

Polyol 220-110: polypropylene glycol, available from Dow Company, the molecular weight being about 1000;

CN8004: polyurethane containing an acryloxy group, also called polyurethane acrylate oligomer, available from Sartomer Company, average functionality being less than 2, and Tg being about −3□;

CN9002: polyurethane containing an acryloxy group, also called polyurethane acrylate oligomer, available from Sartomer Company, average functionality being about 2, and Brookfield viscosity at 60 being about 2800-3500 cp;

Isobornyl acrylate: acrylate monomer, available from Sartomer Company;

Hydroxypropyl methacrylate: methacrylate monomer, available from Aldrich Chemicals;

Lauryl acrylate: acrylate monomer, available from Sartomer Company;

K1612: hexafluoroantimonate-based ammonium salt, a thermal polymerization catalyst, available from King industry Inc;

Darocure 1173: 2-Hydroxy-2-methyl-1-phenyl-propan-1-one, radical photo polymerization initiator, available from Ciba Specialty Chemicals Inc.;

Irgacure784: bis[2,6-difluoro-3-(1H-pyrrol-1-yl)phenyl]titanium, cationic photo polymerization initiator, available from Ciba Specialty Chemicals Inc.

Test Methods

A series of tests were carried out to demonstrate the advantageous effects of the dual-curable adhesive composition of the present invention, including UV-curing test, adhesion strength test, thermal curing test and shadow area test etc.

<UV-Curing Test>

The dual-curable adhesive composition obtained from the above was applied between a glass plate and a PC plate at room temperature. The applying depth of the composition was about 100 μm. Two samples of the glass plate/dual-curable adhesive composition/PC plate which were the same with each other were prepared for the following adhesion strength test and thermal curing test. The two glass plate/dual-curable adhesive composition/PC plate samples were irradiated by using ultraviolet light (manufacturer: Loctite Corporation, mode: UVALOC1000), with the energy dose being 3000 mJ/cm$^2$, the power density being about 100 mW/cm$^2$, and the irradiation time being 30 seconds. The curing results of the samples in the transparent portions were observed.

<Adhesion Strength Test>

After taking the UV-curing test as mentioned above, the glass plate was peeled away from the PC plate in the direction perpendicular to the surface of the glass plate, the peeling force was determined by using Materials Peeling Testing Machine (available from Instron Company, Model: Instron 5540). The adhesion strength was calculated by dividing the force value by the overlapping area of the glass plate and the PC plate (unit: Mpa).

<Thermal Curing Test>

After taking the UV-curing test as mentioned above, the sample was placed in a drying oven (Thermostatic Oven LH-213, available from ESPEC Company), at a temperature of about 80° to be heated for about 2 hours. Subsequently, the sample is taken out to observe the curing results.

<Shadow Area Test>

After taking the thermal curing test as mentioned above, the glass plate was separated from the PC plate to observe the curing results in the shadow area.

<Preparation of the Composition>

Example 1

Firstly, 35 parts by weight of Synasia S21, 3 parts by weight of isobornyl acrylate, 5 parts by weight of hydroxypropyl methacrylate, 5 parts by weight of lauryl acrylate, 30 parts by weight of CN8004, 15 parts by weight of CN9002 and 2 parts by weight of polyol 220-110 were weighed out respectively at room temperature, and then charged into a stirring kettle and stirred for about 60 mins at a speed of about 60 rpm. Subsequently, 1.5 parts by weight of K1612, 1.5 parts by weight of Darocure 1173 and 2 parts by weight of Irgacure784 were weighed out respectively, and added into the kettle and stirred for another 60 mins at a speed of about 100 rpm. The mixture was filtered after a uniform mix. Light was avoided and the temperature was kept constant during charging and mixing.

The formulation of the dual-curable adhesive composition in Example 1 was as follows:

| | |
|---|---|
| component (a) | 35 parts by weight of Synasia S21 |
| component (b) | 3 parts by weight of isobornyl acrylate |
| | 5 parts by weight of hydroxypropyl methacrylate |
| | 5 parts by weight of lauryl acrylate |
| component (c) | 30 parts by weight of CN8004 |
| | 15 parts by weight of CN9002 |
| component (d) | 1.5 parts by weight of K1612 |
| component (e) | 1.5 parts by weight of Darocure 1173 |
| | 2 parts by weight of Irgacure784 |
| component (f) | 2 parts by weight of polyol 220-110 |

Example 2

The dual-curable adhesive composition in Example 2 was prepared in the same manner as described in Example 1, except employing the following adhesive composition.

The formulation of the dual-curable adhesive composition in Example 2 was as follows:

| | |
|---|---|
| component (a) | 60 parts by weight of Synasia S21 |
| component (b) | 25 parts by weight of isobornyl acrylate |
| component (d) | 1.5 parts by weight of K1612 |

-continued

| | |
|---|---|
| component (e) | 1.5 parts by weight of Darocure 1173 |
| | 2 parts by weight of Irgacure784 |
| component (f) | 10 parts by weight of polyol 220-110 |

Example 3

The dual-curable adhesive composition in Example 3 was prepared in the same manner as described in Example 1, except employing the following adhesive composition.

The formulation of the dual-curable adhesive composition in Example 3 was as follows:

| | |
|---|---|
| component (a) | 55 parts by weight of Synasia S21 |
| component (c) | 30 parts by weight of CN8004 |
| component (d) | 1.5 parts by weight of K1612 |
| component (e) | 1.5 parts by weight of Darocure 1173 |
| | 2 parts by weight of Irgacure784 |
| component (f) | 10 parts by weight of polyol 220-110 |

Example 4

The dual-curable adhesive composition in Example 4 was prepared in the same manner as described in Example 1, except employing the following adhesive composition.

The formulation of the dual-curable adhesive composition in Example 4 was as follows:

| | |
|---|---|
| component (a) | 35 parts by weight of Synasia S21 |
| component (b) | 5 parts by weight of isobornyl acrylate |
| | 5 parts by weight of hydroxypropyl methacrylate |
| | 5 parts by weight of lauryl acrylate |
| component (c) | 30 parts by weight of CN8004 |
| | 15 parts by weight of CN9002 |
| component (d) | 1.5 parts by weight of K1612 |
| component (e) | 1.5 parts by weight of Darocure 1173 |
| | 2 parts by weight of Irgacure784 |

Comparative Example 1

The dual-curable adhesive composition in Comparative Example 1 was prepared in the same manner as described in Example 1, except employing the following adhesive composition.

The formulation of the dual-curable adhesive composition in Comparative Example 1 was as follows:

| | |
|---|---|
| component (a) | 90 parts by weight of Synasia S21 |
| component (e) | 3 parts by weight of Irgacure784 |
| component (f) | 7 parts by weight of polyol 220-110 |

Comparative Example 2

The dual-curable adhesive composition in Comparative Example 2 was prepared in the same manner as described in Example 1, except employing the following adhesive composition.

The formulation of the dual-curable adhesive composition in Comparative Example 2 was as follows:

| | |
|---|---|
| component (a) | 40 parts by weight of Synasia S21 |
| component (b) | 10 parts by weight of isobornyl acrylate |
| | 3 parts by weight of hydroxypropyl methacrylate |
| component (c) | 30 parts by weight of CN8004 |
| | 10 parts by weight of CN9002 |
| component (e) | 3 parts by weight of Darocure 1173 |
| | 2 parts by weight of Irgacure784 |
| component (f) | 2 parts by weight of polyol 220-110 |

Comparative Example 3

The dual-curable adhesive composition in Comparative Example 3 was prepared in the same manner as described in Example 1, except employing the following adhesive composition.

The formulation of the dual-curable adhesive composition in Comparative Example 3 was as follows:

| | |
|---|---|
| component (a) | 40 parts by weight of Synasia 521 |
| component (b) | 10 parts by weight of isobornyl acrylate |
| | 3 parts by weight of hydroxypropyl methacrylate |
| component (c) | 30 parts by weight of CN8004 |
| | 10 parts by weight of CN9002 |
| component (d) | 2 parts by weight of K1612 |
| component (e) | 3 parts by weight of Darocure 1173 |
| component (f) | 2 parts by weight of polyol 220-110 |

Comparative Example 4

The dual-curable adhesive composition in Comparative Example 4 was prepared in the same manner as described in Example 1, except employing the following adhesive composition.

The formulation of the dual-curable adhesive composition in Comparative Example 4 was as follows:

| | |
|---|---|
| component (a) | 35 parts by weight of Synasia S21 |
| component (b) | 6.5 parts by weight of isobornyl acrylate |
| | 5 parts by weight of hydroxypropyl methacrylate |
| | 5 parts by weight of lauryl acrylate |
| component (c) | 30 parts by weight of CN8004 |
| | 15 parts by weight of CN9002 |
| component (e) | 1.5 parts by weight of Darocure 1173 |
| | 2 parts by weight of Irgacure784 |

The dual-curable adhesive compositions obtained in Examples 1 to 5 and Comparative Examples 1 to 4 were subjected to the above-mentioned tests. The test results are listed as below.

| | Test Method | | | |
|---|---|---|---|---|
| Example/ Comparative Example | UV-curing test (transparent portions) | adhesion strength test (Mpa) | thermal curing test | shadow area test |
| Example 1 | completely cured | >0.4 | cured | cured |
| Example 2 | completely cured | >0.4 | cured | cured |
| Example 3 | completely cured | >0.4 | cured | cured |
| Example 4 | completely cured | >0.4 | cured | cured |
| Comparative Example 1 | completely cured | >0.6 | not cured | liquid, not cured |
| Comparative Example 2 | completely cured | >0.4 | not cured | liquid, not cured |
| Comparative Example 3 | partly cured | >0.4 | cured | cured |

-continued

| Example/ Comparative Example | UV-curing test (transparent portions) | adhesion strength test (Mpa) | thermal curing test | shadow area test |
|---|---|---|---|---|
| Comparative Example 4 | completely cured | >0.4 | not cured | liquid, not cured |

As can be seen from the table above, the dual-curable adhesive compositions obtained in Examples 1 to 4 according to the present invention exhibited excellent light curing effects in the transparent portions of the substrates and post-curing adhesion strengths, and the dual-curable adhesive composition cured completely in the shadow portions after being heated. In contrast, the dual-curable adhesive compositions in Comparative Examples 1, 2 and 4 didn't contain a thermal polymerization catalyst, and the adhesives in the shadow portions were still in liquid states and didn't completely cured after being heated. The photo polymerization initiator in Comparative Example 3 only used a radical photo polymerization initiator and didn't contain a cationic photo polymerization initiator, the epoxy resin didn't completely cured upon light irradiation and showed a inferior light curing effect.

The embodiments described above are intended to illustrate the present invention and should not be construed as restricting the invention set forth in the appended claims or reducing the scope thereof. The foregoing embodiments are not limitative in construction but can of course be modified within the scope of the claims.

What is claimed is:

1. A dual-curable adhesive composition, comprising:
   component (a): an epoxy resin;
   at least one selected from component (b) and component (c), wherein component (b) is a (meth)acrylate monomer, and component (c) is an oligomer containing a (meth)acryloxy group;
   component (d): a thermal polymerization catalyst which catalyzes the thermal polymerization reaction of component (a);
   component (e): a photo polymerization initiator which initiates the photo polymerization reaction of component (a) and at least one selected from component (b) and component (c), wherein component (e) is a mixture of a cationic photo polymerization initiator and a radical photo polymerization initiator,
   and component (f): polyether polyols.

2. The composition according to claim 1, wherein component (a) has on average at least two 1,2-epoxy groups per molecule;
   component (a) is selected from the group consisting of polyglycidyl ethers of polyphenols, polyglycidyl ethers of aliphatic polyols, polyglycidyl esters of aliphatic polycarboxylic acids, polyglycidyl esters of aromatic polycarboxylic acids, their derivatives, and any combination thereof;
   component (a) is liquid at 25° C.;
   the epoxy equivalent of component (a) is 100 to 220; and,
   component (a) has a Brookfield viscosity in the range of 300 cp to 10,000 cp at 25° C.

3. The composition according to claim 1, wherein component (b) is a multifunctional (meth)acrylate monomer, or a monofunctional (meth)acrylate monomer selected from the group consisting of alkyl (meth)acrylate, alkenyl (meth)acrylate and heterocyclic (meth)acrylate, or any combination thereof, wherein the alkyl group has 1 to 20 carbon atoms and it is optionally substituted, the alkenyl group has 2 to 20 carbon atoms and it is optionally substituted, and the heterocyclic group has 2 to 20 carbon atoms and at least one heteroatom selected from nitrogen and oxygen, and it is optionally substituted, wherein the substituent being at least one independently selected from the group consisting of an alkyl group having 1 to 10 carbon atoms, an alkoxy group having 1 to 10 carbon atoms, an aryloxy group having 6 to 10 carbon atoms, an epoxy group, and a hydroxy group; and
   component (b) is liquid at 25° C.

4. A dual-curable adhesive composition, comprising:
   component (a): an epoxy resin;
   at least one selected from component (b) and component (c), wherein component (b) is a (meth)acrylate monomer, and component (c) is an oligomer containing a (meth)acryloxy group;
   component (d): a thermal polymerization catalyst which catalyzes the thermal polymerization reaction of component (a); and
   component (e): a photo polymerization initiator which initiates the photo polymerization reaction of component (a) and at least one selected from component (b) and component (c), wherein component (e) is a mixture of a cationic photo polymerization initiator and a radical photo polymerization initiator,
   wherein component (c) is a member selected from the group consisting of containing a (meth)acryloxy group, polyisoprene containing a (meth)acryloxy group, polyurethane containing a (meth)acryloxy group and polyester containing a (meth)acryloxy group, and any combination thereof;
   component (c) has at least one epoxy group per molecule;
   component (c) is liquid at 25° C.;
   component (c) has an average (meth)acryloxy functionality of greater than 0 but less than or equal to 3.

5. A dual-curable adhesive composition, comprising:
   component (a): an epoxy resin;
   at least one selected from component (b) and component (c), wherein component (b) is a (meth)acrylate monomer, and component (c) is an oligomer containing a (meth)acryloxy group;
   component (d): a thermal polymerization catalyst which catalyzes the thermal polymerization reaction of component (a); and
   component (e): a photo polymerization initiator which initiates the photo polymerization reaction of component (a) and at least one selected from component (b) and component (c), wherein component (e) is a mixture of a cationic photo polymerization initiator and a radical photo polymerization initiator, wherein component (d) is a hexafluoroantimonate-based metal salt.

6. The composition according to claim 1, wherein the cationic photo polymerization initiator in component (e) is selected from the group consisting of aromatic diazonium salts, aromatic sulfonium salts, aromatic iodonium salts, alkyl sulfonium salts, (6-cumene)(5-cyclopentadienyl)iron hexafluorophosphate, titanocenes, sulfonyloxy ketones and triaryl-siloxyethers, and any combination thereof, wherein the alkyl group has 1 to 30 carbon atoms, and the aryl group has 7 to 30 carbon atoms; and
   the radical photo polymerization initiator is selected from the group consisting of benzoin ketals, hydroxyketones, amino ketones, acylphosphine peroxides, and any combination thereof.

7. A dual-curable adhesive composition, comprising:
   component (a): an epoxy resin;

component (b): a (meth)acrylate monomer;
component (c): an oligomer containing a (meth)acryloxy group;
component (d): a thermal polymerization catalyst which catalyzes the thermal polymerization reaction of component (a); and
component (e): a photo polymerization initiator which initiates the photo polymerization reaction of component (a) and at least one selected from component (b) and component (c), wherein component (e) is a mixture of a cationic photo polymerization initiator and a radical photo polymerization initiator,
wherein the composition optionally comprises one or more other additives selected from the group consisting of thermally curing agents, light sensitizers, radical scavengers, photo stabilizers, wetting agents, leveling agents, colorants and plasticizers;
and, wherein the thermally curing agent is an amine-based curing agent, and the content of the thermally curing agent is 0 to 60 parts by weight based on 100 parts by weight of the composition.

8. The composition according to claim 1, wherein based on 100 parts by weight of the composition, the content of each component is:
20-80 parts by weight of component (a);
10-75 parts by weight of component (b);
0.5-5 parts by weight of component (d);
1-5 parts by weight of component (e); and
0-10 parts by weight of component (f).

9. The composition according to claim 1, wherein based on 100 parts by weight of the composition, the content of each component is:
20-80 parts by weight of component (a);
15-80 parts by weight of component (c);
0.5-5 parts by weight of component (d);
1-5 parts by weight of component (e); and
0-10 parts by weight of component (f).

10. The composition according to claim 1, wherein based on 100 parts by weight of the composition, the content of each component is:
20-60 parts by weight of component (a);
15-60 parts by weight of component (b);
15-60 parts by weight of component (c);
0.5-5 parts by weight of component (d);
1-5 parts by weight of component (e); and
0-10 parts by weight of component (f);
wherein the total content of component (b) and component (c) is 20-75 parts by weight.

11. The composition according to claim 1, wherein the composition is liquid at 25° C., the light transmittance of the composition after curing is more than 95%, and the haze of the composition after curing is less than 1%;
the composition has a Brookfield viscosity of 50 to 40,000 cp at 25° C.

12. A process for using the composition according to claim 2 comprising bonding or laminating a transparent substrate with another transparent substrate, or bonding or laminating a transparent substrate with a non-transparent substrate; and
the transparent substrate comprises glass and transparent plastic, and the non-transparent substrate comprises metal, non-transparent plastic, ceramic, stone, leather and wood.

13. A process for bonding substrates, comprising the following steps:
applying the composition according to claim 2 between the substrates to be bonded;
exposing the substrates which have been applied with the composition to photo irradiation; and
heating the substrates which have been applied with the composition;
the photo irradiation step is preferably carried out before the heating step;
the composition is applied between a transparent substrate and another transparent substrate, or between a transparent substrate and a non-transparent substrate;
the transparent substrate comprises glass and transparent plastic, and the non-transparent substrate comprises metal, non-transparent plastic, ceramic, stone, leather and wood.

14. The process according to claim 13, wherein after the photo irradiation step, the substrates are locally heated at portions which have not been completely cured.

15. The composition according to claim 1, wherein said composition comprises component (c), and wherein component (c) is a member selected from the group consisting of polybutadiene containing a (meth)acryloxy group, polyisoprene containing a (meth)acryloxy group, polyurethane containing a (meth)acryloxy group and polyester containing a (meth)acryloxy group, and any combination thereof;
component (c) has at least one epoxy group per molecule;
component (c) is liquid at 25° C.; and,
component (c) has an average (meth)acryloxy functionality of greater than 0 but less than or equal to 3.

16. The composition according to claim 1, wherein component (d) is a hexafluoroantimonate-based ammonium salt.

17. The composition according to claim 1, wherein the composition comprises both component (b) and component (c).

* * * * *

UNITED STATES PATENT AND TRADEMARK OFFICE
CERTIFICATE OF CORRECTION

PATENT NO. : 9,783,713 B2
APPLICATION NO. : 14/271519
DATED : October 10, 2017
INVENTOR(S) : Rui Zhang and Daoqiang Lu Page 1 of 1

It is certified that error appears in the above-identified patent and that said Letters Patent is hereby corrected as shown below:

In the Specification

Column 2, Line 32: Change "300 op" to -- 300 cp --.

Column 6, Line 29: Change "25V" to -- 25°C. --.

Column 6, Line 45: Change "substitutent" to -- substituent --.

Column 6, Line 52: Change "substitutent" to -- substituent --.

Column 6, Line 60: Change "substitutent" to -- substituent --.

Column 9, Line 47: Change "his (pentafluorophenyl)" to -- bis (pentafluorophenyl) --.

Column 10, Line 28: Change "dial" to -- diol --.

Signed and Sealed this
Eighth Day of May, 2018

Andrei Iancu
*Director of the United States Patent and Trademark Office*